(No Model.)
F. R. SCHLOER.
GAGE ATTACHMENT FOR SCROLL SAWING MACHINES.
No. 373,686. Patented Nov. 22, 1887.
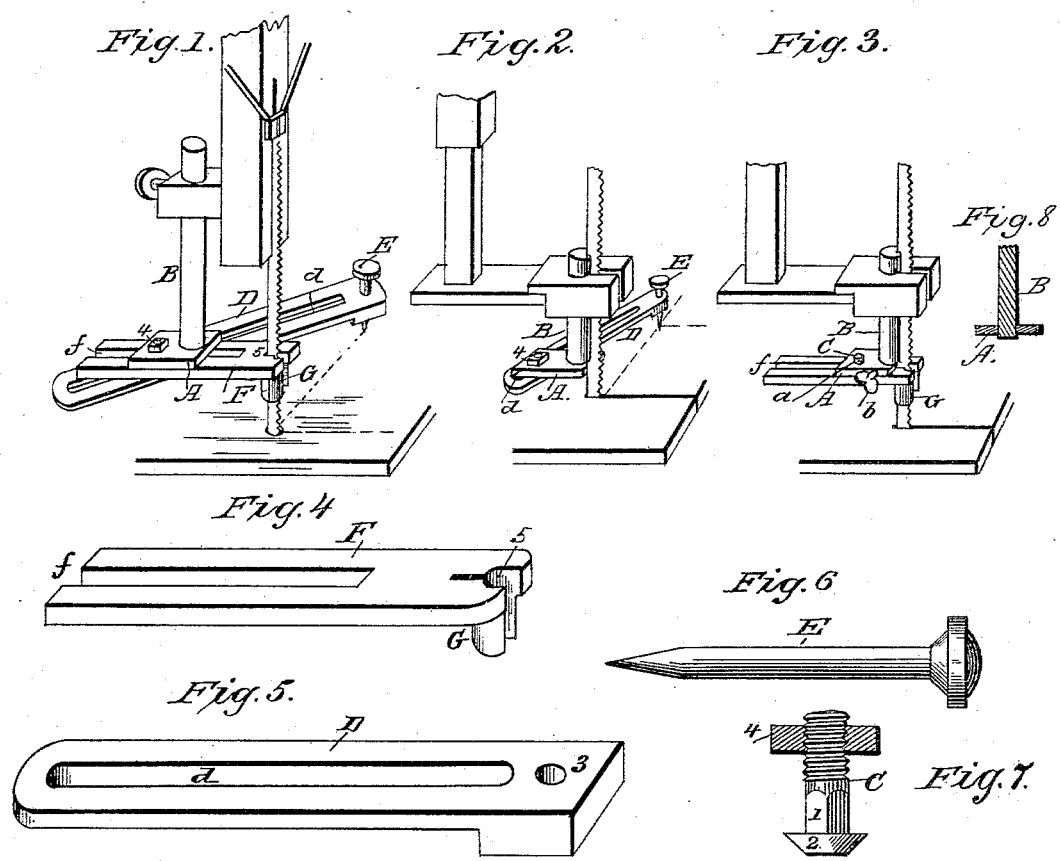
WITNESSES:
Fred G. Ditterich
P. B. Turpin
INVENTOR:
F. R. Schloer
BY Munn & Co.
ATTORNEYS.

UNITED STATES PATENT OFFICE.

FRANK. R. SCHLOER, OF BALTIMORE, MARYLAND.

GAGE ATTACHMENT FOR SCROLL-SAWING MACHINES.

SPECIFICATION forming part of Letters Patent No. 373,686, dated November 22, 1887.

Application filed October 15, 1886. Serial No. 216,359. (No model.)

*To all whom it may concern:*

Be it known that I, FRANK. R. SCHLOER, of Baltimore city, and State of Maryland, have invented a new and useful Improvement in Gage Attachments for Scroll Sawing Machines, of which the following is a specification.

My invention is an improvement in gages for use in sawing circular and irregular forms, and has for an object to provide simple devices adapted to be supported on the framing of the sawing-machine, and so constructed, as will be described, as to reduce the time and labor of sawing, to avoid the necessity and consequent expense of marking each piece to be sawed, and to insure greater accuracy and neatness of work.

The invention consists, broadly, in a gage suitably supported above the work passage or support, and adjustable, as will be described.

The invention consists, further, in certain features of construction and novel combinations of parts, as will be hereinafter described and claimed.

In the drawings, Figure 1 is a perspective view of a part of a scroll-sawing machine with my improved gages in place. Fig. 2 is a perspective view of a band sawing-machine with the centering-gage in place. Fig. 3 is a perspective view of a hand sawing-machine with my stop-gage in place. Fig. 4 represents the stop-gage in detail. Fig. 5 represents the centering-gage in detail. Fig. 6 is a detail view of the center-pin for circular work. Fig. 7 represents the clamping screw and nut in detail, and Fig. 8 is a detached section of a part of the post B and plate A as shown in Fig. 3.

In carrying out my invention I secure a plate, A, on a post, B, which latter forms a portion of the upper part of the frame of a sawing-machine. This plate, when it is intended for use solely with the centering-gage, may be fixed immovably to or formed integral with the post B; but for use with the stop-gage I journal the plate on the post and provide means—usually a clamping-screw, *b*, as shown in Fig. 8—by which to secure the plate in any suitable rotary adjustment on the post, as shown in Fig. 8.

Through the plate A, I form an opening for the bolt C, which, in the construction shown, has an angular portion, 1, adjacent its head 2.

The centering-gage D is formed of a plate having a longitudinal slot, *d*, and is provided at or near one end with an opening, 3, for the center-pin E. Such end of the plate is usually thickened, as shown, in order to provide a longer bearing for the pin E, and thereby to support the said pin more steadily, as will be readily understood.

In use the bolt C is passed up through slot *d*, its angular portion 1 fitting such slot and its head 2 bearing beneath the gage. The point of the screw is then passed up through opening *a* in supporting-plate A, and the nut 4 is turned into such end. Before tightening such nut the plate may be set longitudinally and rotarily on said bolt, so that the pin E may be adjusted to any suitable distance from the saw and at right angles thereto. When so adjusted, the gage-plate, with its pin, may be secured in the desired position by tightening the nut against the supporting-plate. The portion 1 of the bolt is preferably made angular, as thereby the gage-plate cannot by any possibility turn on the said bolt. When the parts are set as described, the work may be placed on the table and the pin E driven down thereinto. Then by turning the work on the pin E as a center the saw will cut a circle of a diameter twice the distance from the saw to the centering-pin, and this accurately and without the necessity of marking the work or of following any guides. It will also be seen that any number of circles of the same size may be cut accurately and with facility. The centering-pin should be arranged at right angles to the saw to prevent the latter from binding in the work, as will be obvious to those skilled in the art.

The stop-gage F has a longitudinal slot, *f*, fitted to the part 1 of screw C, and is formed with an opening forming a saw passage or slit, 5, and with a stop-guard, G. This guard is extended from the under side of the plate laterally to the opening 5, and is externally of a shape approximately circular in cross section, and in use the gage F is set with this circular surface in a circle struck from the saw as a center. The supporting-plate, in the use of this gage, is adjustable on its post, in order that the gage may be set accurately with reference to the saw to suit saws of different thicknesses and partly-worn saws, as will be readily understood.

In the use of this gage in sawing irregular work, for which it is especially intended, a pattern is used, and such pattern is cut one-half the diameter of the guard smaller than the piece to be sawed, and is secured on the work by tacks, brads, or in other suitable manner. The edge of the pattern now forms a bearing which is held to and against the guard, and the latter serves as a stop to prevent the work slipping or being drawn in any manner up to the saw, so as to cut the work too small, and so ruin the said work.

In Fig. 1 the gages are shown combined, so that in cutting circular work, if a pattern be secured thereon and the center-pin should yield in any manner to permit the work to give, the work could not run into the saw and cut smaller than desired, the stop-guard gage thus supplementing the centering-gage.

While I prefer the construction as shown for connecting my gage devices to the framing of the machine, it is manifest that in view of the many sizes and forms of band and scroll saws in use such constructions may be varied without departing from the broad principles of my invention.

The support, it will be seen, has an unobstructed bearing face or surface, in contact with which the gage-bar may be turned or swung in order to bring the centering-pin properly into line at right angles to the saw when said pin is adjusted at different distances from said saw.

Having thus described my invention, what I claim as new is—

1. In a sawing-machine, the combination of the pin and its supporting-bar, having a slot, $d$, a support for such bar, having a flat under surface above the saw-table, and the clamping-bolt connecting the bar with the support and passed through the slot $d$ of said bar, whereby the said bar may be adjusted longitudinally or pivotally in order to set the centering-pin at different distances from the saw and in a line laterally thereto, substantially as and for the purposes specified.

2. The combination of the post B, the plate A, having opening $a$, the screw $b$, whereby to connect such plate with said post, the gage-plate having an opening for the passage of the saw, and provided with a stop-guard, and a connection for securing such gage-plate to plate A, substantially as set forth.

3. The combination of the sawing-machine frame, comprising a table and a support arranged thereover, the centering-guard having an opening forming a guide for the centering-pin, the centering-pin, the stop-guard gage, and a connection for securing such gages to the support, substantially as set forth.

FRANK. R. SCHLOER.

Witnesses:
JNO. T. MADDOX,
ROBERT W. HAYS.